United States Patent [19]

Izumi et al.

[11] Patent Number: 4,570,831

[45] Date of Patent: Feb. 18, 1986

[54] DISPERSING FEEDER

[75] Inventors: Asashiro Izumi, Kusatsu; Masao Fukuda, Kouga, both of Japan

[73] Assignee: Kabushiki Kaisha Ishida Koki Seisakusho, Kyoto, Japan

[21] Appl. No.: 395,905

[22] Filed: Jul. 7, 1982

[30] Foreign Application Priority Data

Jul. 7, 1981 [JP] Japan .......................... 56-101293[U]
Jul. 7, 1981 [JP] Japan .......................... 56-101292[U]

[51] Int. Cl.⁴ ............................................. B65G 27/12
[52] U.S. Cl. .................................... 222/199; 198/756
[58] Field of Search ............... 198/608, 609, 611, 614; 221/236, 277, 237; 177/25; 198/756, 757, 953; 222/478, 488, 199; 239/681, 687

[56] References Cited

U.S. PATENT DOCUMENTS

| | | | |
|---|---|---|---|
| 2,827,210 | 3/1958 | Ballard et al. | 222/478 |
| 3,490,618 | 1/1970 | Buschbom | 239/687 X |
| 3,490,619 | 1/1970 | Wittie | 239/687 X |
| 3,578,094 | 5/1971 | Henry . | |
| 4,398,612 | 8/1983 | Mikami et al. | 177/25 |

FOREIGN PATENT DOCUMENTS

| | | |
|---|---|---|
| 1245861 | 7/1967 | Fed. Rep. of Germany . |
| 1586353 | 4/1970 | Fed. Rep. of Germany . |
| 115080 | 9/1975 | German Democratic Rep. . |

Primary Examiner—Stanley H. Tollberg
Attorney, Agent, or Firm—Staas & Halsey

[57] ABSTRACT

A dispersing feeder for dispersively feeding articles, supplied by a supply device, to a plurality of weighing machines where the articles are weighed. The feeder includes a turntable or conical projection for receiving and temporarily retaining the articles supplied by the supply device, a dispersing bowl disposed concentrically with respect to the turntable or conical projection and having a number of exits on its outer circumferential portion, and an electromagnetic vibrator for subjecting the dispersing bowl to torsional reciprocative oscillation. The surface of the turntable and/or dispersing bowl is provided with a multiplicity of raised and recessed portions to minimize the contact area between the surface and the articles so that the articles may be transferred without adhering to the surface.

9 Claims, 11 Drawing Figures

DISPERSING FEEDER

BACKGROUND OF THE INVENTION

This invention relates to a dispersing feeder and, more particularly, to a dispersing feeder suited for use in a so-called combination computing-type automatic weighing system wherein combinations of weight values are computed using a plurality of weighing machines in order to obtain a predetermined weight value or a weight value closest to the predetermined weight value within set limits.

A conventional dispersing feeder of the above type for use in a combination computing automatic weighing system relies upon a conically shaped turntable to dispersively distribute articles evenly into a dispersing bowl arranged around the turntable. With the conventional dispersing feeder, however, viscous or "sticky" articles such as boiled beans tend to attach themselves to the turntable and, hence, are difficult to dispense into the dispersing bowl in a reliable manner. Moreover, articles having a comparatively high degree of viscosity, such as articles consisting of jelly, readily adhere to the dispersing bowl and are difficult to transfer.

BRIEF SUMMARY OF THE INVENTION

Accordingly, an object of the present invention is to provide a dispersing feeder in which even sticky articles will not adhere to the turntable.

Another object of the present invention is to provide a dispersing feeder in which even articles possessed of a high degree of viscosity will not adhere to the turntable.

Still another object of the present invention is to provide a dispersing feeder in which a turntable adapted to be driven rotatively is provided with a rugged or irregular surface, and in which a dispersing bowl capable of torsional reciprocative oscillation is disposed surrounding the turntable and concentric therewith, whereby viscous articles can be dispersed smoothly and reliably.

A further object of the present invention is to provide a dispersing feeder having a centrally provided conical projection and a dispersing bowl, capable of torsional reciprocative oscillation, the article transfer surface whereof has a rugged or irregular profile, whereby viscous articles can be dispersed smoothly and reliably.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
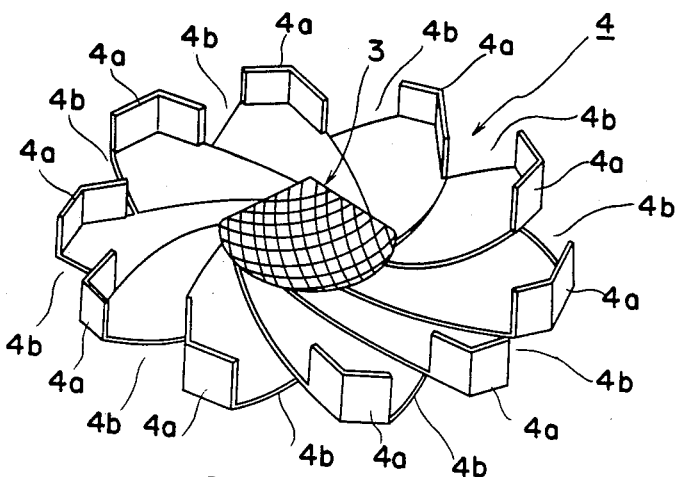
FIG. 1 is a perspective view showing a first embodiment of a dispersing feeder according to the present invention.
Figure 2:
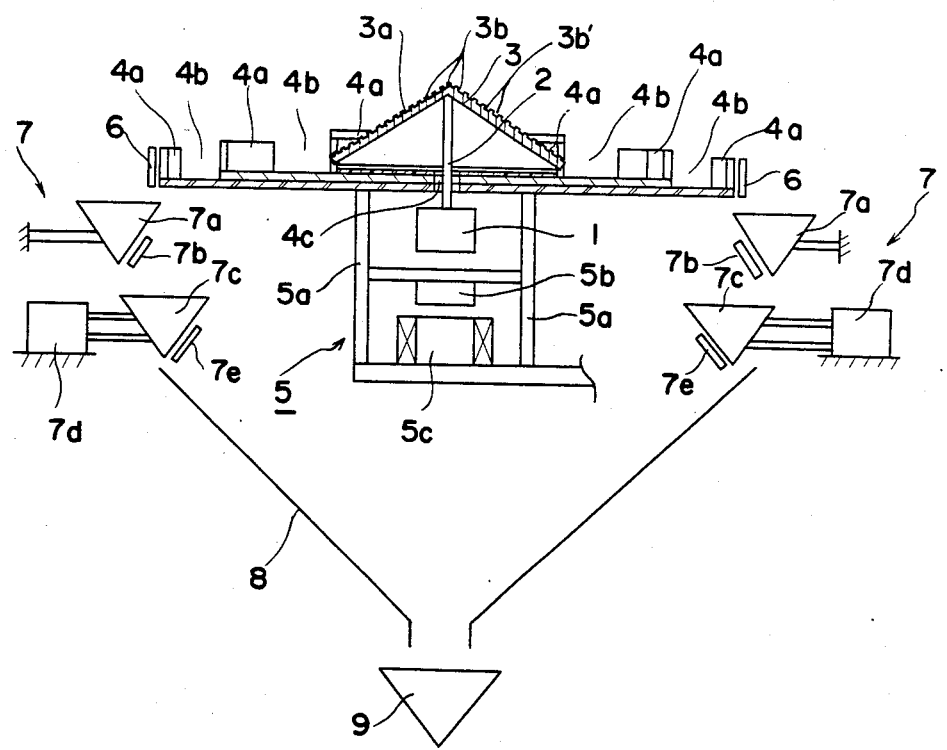
FIG. 2 is a sectional view of the dispersing feeder.
Figure 3:
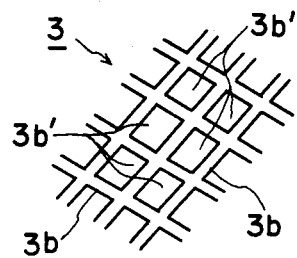
FIG. 3 is an illustrative view useful in describing the surface of a conical portion of a turntable.
Figure 4:
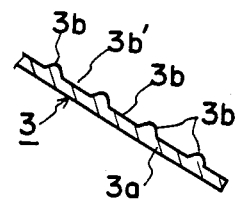
FIG. 4 is a sectional view showing a principal portion of the turntable.

Referring to FIGS. 1 and 2, a shaft 2, connected to a driving motor 1, has a conically shaped turntable 3 affixed to the upper end thereof. The turntable 3 has a conical portion 3a whose surface is formed to include a grid-like array of raised portions 3b as well as recessed portions 3b' surrounded by the raised portions, as shown more clearly in FIGS. 3 and 4. The raised portions 3b and recessed portions 3b' may be formed by pressing. Alternatively, a wire net can be spread over the conical portion 3a, formed to have a flat, smooth surface, and the net can be coated with urethane rubber. A dispersing bowl 4, capable of torsional reciprocative oscillation, is disposed around the turntable 3 and arranged concentrically therewith. Provided about the circumference of the dispersing bowl 4 are equally spaced-apart side walls 4a, 4a . . . , as well as exit portions 4b, 4b . . . defined between adjacent side walls 4a, 4a for discharging articles. The dispersing bowl 4 further includes an inner circumferential portion 4c provided below the turntable 3 in such fashion as not to contact the turntable. The dispersing bowl 4 has a base portion to which an electromagnetic vibrator 5 is attached. The dispersing bowl 4 undergoes torsional reciprocative oscillation owing to a centrifugal force produced by the torsional reciprocative motion of the vibrator 5. The latter includes spring members 5a, 5a, a magnetic body 5b, and an electromagnet 5c. The electromagnet 5c is excited intermittently to produce the torsional reciprocative motion.

The exit portions 4b, 4b . . . of the dispersing bowl 4 are provided with respective shutters 6, 6 . . . (only two of which are depicted in FIG. 2) which are opened at a suitable timing to feed the articles from the dispersing bowl 4 to weighing machines designated at numeral 7. The weighing machines 7, 7 . . . are disposed beneath each of the exit portions 4b, 4b in order to weigh articles dispensed by the dispersing bowl 4. Each weighing machine 7 includes a pool hopper 7a, a pool hopper bucket 7b, a weighing hopper 7c, a weight sensor 7d, and a weighing hopper gate 7e. Each pool hopper 7a is arranged so as to receive articles discharged from the dispersing bowl 4. When a pool hopper bucket 7b provided on a pool hopper 7a is opened, the articles contained in that pool hopper 7a are charged into the corresponding weighing hopper 7c. Each weighing hopper 7c has a weighing sensor 7d affixed thereto for the purpose of measuring the weight of the articles loaded into the weighing hopper and for sending a signal indicative of the measured weight to a combination computing unit, which is not shown. The weighing hoppers 7c are provided with respective ones of the weighing hopper gates 7e. When articles collected in the weighing hoppers 7c are to be discharged, prescribed ones of the weighing hopper gates 7e are opened in response to a command from a drive control unit, not shown, whereby the articles in the corresponding weighing hoppers are dumped into a chute 8. The latter collects the articles discharged from the weighing hoppers and guides them inwardly and downwardly toward a timing hopper 9 into which the articles are introduced. The articles are retained within the timing hopper 9 temporarily until a discharge signal arrives from an externally located packaging machine or the like, the timing hopper 9 responding to the signal to release the articles into a suitable container, not shown.

In operation, articles are delivered to the turntable 3 by a feeding apparatus (not shown) located above the turntable. The feeding apparatus, operated by suitable drive means, is adapted to keep the turntable 3 supplied with articles to a certain level at all times. When the turntable 3 is rotated by the driving motor 1, therefore, the articles which have been delivered to the turntable are acted upon by centrifugal force that causes the articles to gradually radiate toward the outer circumference of the turntable from the surface of the cone 3a having the raised and recessed portions 3b, 3b'. The dispersing bowl 4 is thus supplied with the articles in suitable increments. Owing to the raised and recessed portions 3b, 3b' formed on the surface of cone 3a, there is reduced surface contact between the articles and said surface so that the articles can be dispensed into the dispersing bowl 4 reliably without adhering to the conical surface during transfer. As the articles are being delivered to the dispersing bowl 4 in the above fashion, the dispersing bowl is oscillating back and forth owing to the torsional vibration of vibrator 5, whereby the articles gradually migrate toward the exits 4b at the circumference of the bowl. When the shutters 6 are opened, the articles fall from the exits 4b into the pull hoppers 7a of the weighing machines 7.

It goes without saying that the surface of the dispersing bowl 4 can be provided with raised and recessed portions similar to those on the surface of the turntable 3.

Figure 7:
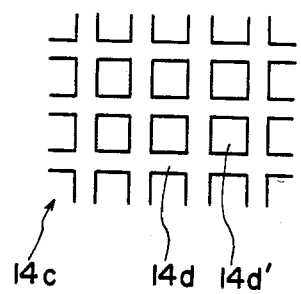
FIG. 7 is an illustrative view showing, in enlarged form, the transfer surface of a dispersing bowl.
Figure 8:
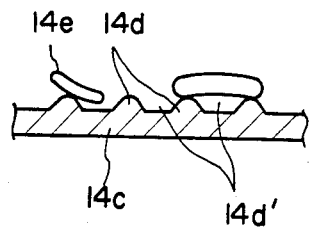
FIG. 8 is a sectional view showing a principal portion of the dispersing bowl in enlarged form.
Figure 5:
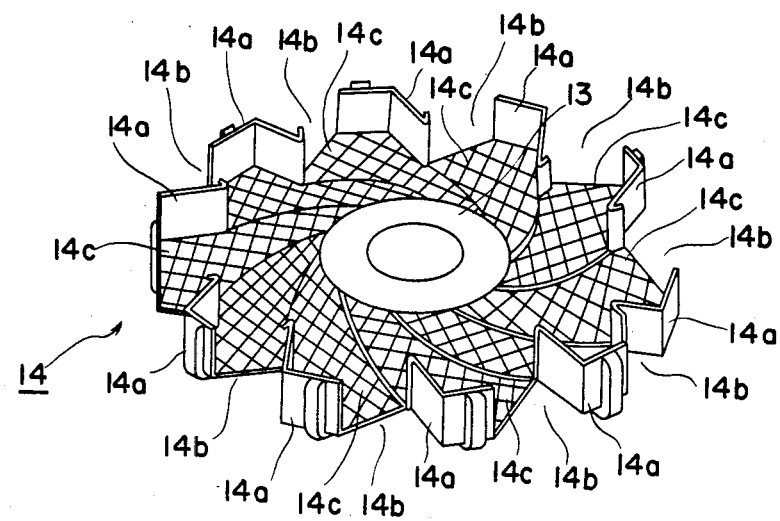
FIG. 5 is a perspective view showing a second embodiment of a dispersing feeder according to the present invention.
Figure 6:
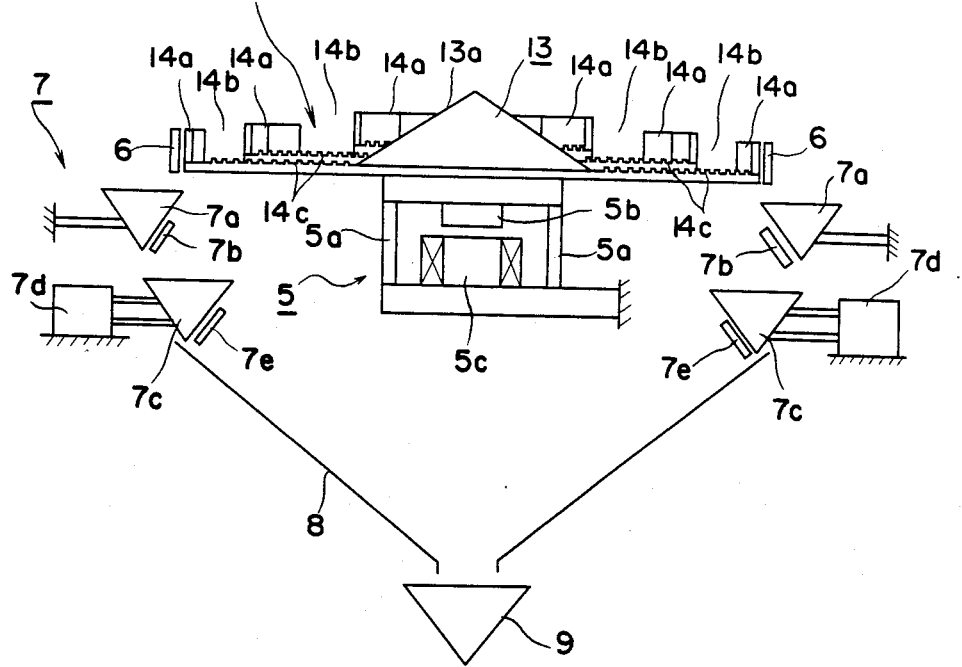
FIG. 6 is a sectional view of the dispersing feeder illustrated in FIG. 5.

Reference will now be had to FIGS. 5 and 6 to describe another embodiment of the present invention. A dispersing bowl 14 undrgoes torsional reciprocative oscillation owing to the centrifugal force produced by the torsional reciprocative motion of the vibrator 5 secured to the base of the bowl 14. Provided about the circumference of the dispersing bowl 14 are equally spaced-apart side walls 14a, 14a . . . , as well as exit portions 14b, 14b . . . defined between adjacent side walls 14a, 14a for discharging articles. The dispersing bowl 14 further includes a conically shaped projection 13 formed integral with the bowl 14 at the central portion thereof. It should be noted, however, that the projection 13 can be replaced by a conically shaped turntable, similar to the one depicted in FIGS. 1 and 2, which turntable would be mounted at the central portion of the dispersing bowl 14 to form a unitary structure therewith. As shown in FIGS. 7 and 8, the transfer surface 14c of the dispersing bowl 14 is formed to include a grid-like array of raised portions 14d as well as recessed portions 14d' surrounded by the raised portions. In FIG. 8, numeral 14e denotes an article being weighed, specifically a piece of jelly.

In operation, articles are delivered to the projection 13 of the dispersing bowl 14 by a feeding apparatus (not shown) located above the projection 13. The feeding apparatus, operated by suitable drive means, is adapted to keep the conically shaped projection 13 supplied with articles to a certain level at all times. Under these conditions, the dispersing bowl 14 and conical projection 13 are subjected to torsional reciprocative oscillation by the electromagnetic vibrator 5. Such oscillatory motion causes the articles which have been delivered to the conical portion 13 to gradually radiate toward its outer circumference from the surface 13a thereof. The dispersing bowl 14 is thus supplied with the articles in suitable increments. As the articles are being delivered to the dispersing bowl 14 in the above fashion, the dispersing bowl is oscillating in and out owing to the torsional vibration of vibrator 5, whereby the articles gradually migrate toward the exits 14b at the circumference of the bowl. When the shutters 6 are opened, the articles fall from the exits 14b into the pull hoppers 7a of the weighing machines 7. Owing to the raised and recessed portions 14d, 14d' formed on the transfer surface 14c of the dispersing bowl 14, there is reduced surface contact between the articles 14e and said surface so that the articles can be dispensed into the pool hoppers 7a reliably without adhering to the transfer surface 14c.

Figure 9:
FIG. 9 is a sectional view showing a projection.
Figure 10:
FIG. 10 is a sectional view showing a modification of the projection illustrated in FIG. 9.

In the embodiment indicated in FIG. 6, the conical surface 13a of the projection 13 is shown to be smooth. This is illustrated more clearly in FIG. 9. It should be noted, however, that the conical surface 13a can be provided with the rugged profile shown in FIG. 10 by forming a gridlike array of raised portions thereon.

Figure 11:
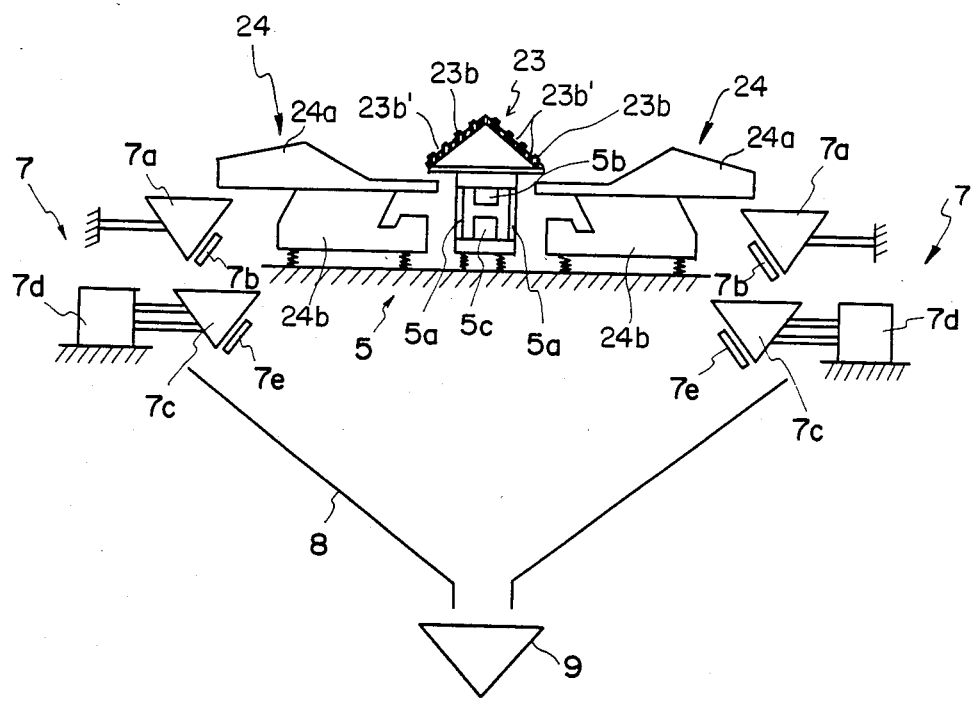
FIG. 11 is a sectional view of the another embodiment of the dispersing feeder.

Reference will now be had to FIG. 11 to describe another embodiment of the present invention. A dispersing table 23 undergoes torsional reciprocative oscillation owing to the centrifugal force produced by the torsional reciprocative motion of the vibrator 5. And the dispersing table 23 has a conical portion 23a whose surface is formed to include a grid-like array of raised portions 23b as well as recessed portions 23b' surrounded by the raised portions. Arranged around the dispersing table 23 along radially extending lines are a plurality of dispersing feeders 24, 24 . . . each of which comprises a main trough 24a and an electromagnetic feeder 24b and feeds the articles by the vibration due to the electromagnetic feeder 24b.

In accordance with the present invention as described and illustrated hereinabove, a turntable adapted to be driven rotatively is provided with a rugged or irregular surface, and a dispersing bowl capable of torsional reciprocative oscillation is disposed surrounding the turntable and concentric therewith. Such an arrangement reduces the surface contact area between the turntable and the articles disposed thereon, so that even viscous articles can be dispersively fed into the dispersing bowl from the turntable in a very reliable manner. Further, in accordance with the present invention, a dispersing table adapted to be oscillated is provided with a rugged or irregular surface, and a plurality of a dispersing feeders capable of oscillation are arranged around the dispersing table. Such an arrangement reduces the surface contact area between the dispersing table and the articles disposed thereon, so that even viscous articles can be dispersively fed into the dispersing feeders from the dispersing table in a very reliable manner. Still further, a dispersing feeder in accordance with another embodiment of the invention has a centrally provided conical projection and a surrounding dispersing bowl, capable of being torsionally oscillated back and forth by suitable drive means, the article transfer surface whereof has a rugged or irregular profile. This arrangement likewise reduces the surface contact area between the articles and the transfer surface of the bowl, so that even viscous articles such as pieces of jelly can be transferred along the surface of the dispersing bowl without adhering thereto.

As many apparently widely different embodiments of the present invention can be made without departing from the spirit and scope thereof, it is to be understood that the invention is not limited to the specific embodiments thereof except as defined in the appended claims.

What we claim is:

1. A dispersing feeder for dispersively feeding articles, supplied by a supplying apparatus, to a plurality of weighing machines where the articles are to be weighed, said feeder comprising:

a conically shaped projection for receiving said articles from the supplying apparatus, said projection comprising a turntable for receiving and temporarily retaining the articles supplied by the supplying apparatus, said turntable having a surface provided with a multiplicity of raised and recessed portions;

driving means for rotatively driving said turntable;

a dispersing path disposed concentrically with respect to said projection and having a plurality of exits formed on the outer circumference thereof, said dispersing path comprising a dispersing bowl disposed concentrically with respect to said turntable; and an article transfer surface comprising said projection and said dispersing path a part of the surface of which being rugged, said turntable being rotated by said driving means to feed the articles to said dispersing bowl, and said dispersing bowl being oscillated to feed the articles into the weighing machines.

2. A dispersing feeder as recited in claim 1, wherein a surface of the turntable is provided with a grid-like array of raised portions and a multiplicity of recessed portions surrounded by the raised portions.

3. A dispersing feeder as recited in claim 1 or 2, wherein said dispersing bowl has a surface provided with a multiplicity of raised and recessed portions.

4. A dispersing feeder as recited in claim 3, wherein said dispersing bowl includes electromagnetic vibrator means, mounted on the exits, for subjecting said dispersing bowl to torsional reciprocative oscillation to feed the articles into the weighing machines from the exits.

5. A dispersing feeder for dispersively feeding articles, supplied by a supplying apparatus, to a plurality of weighing machines where the articles are to be weighed, said feeder comprising:

a concially shaped projection for receiving said articles from the supplying apparatus;

a dispersing path disposed concentrically with respect to said projection and having a plurality of exits formed on the outer circumference thereof, said dispersing path comprising a dispersing bowl provided integral with said projection, said dispersing bowl having a surface provided with a multiplicity of raised and recessed portions;

an article transfer surface comprising said projection and said dispersing path a part of the surface of which being rugged; and electromagnetic vibrator means, mounted on said dispersing bowl, for subjecting said dispersing bowl and said projection to torsional reciprocative oscilliation, and the articles being dispersively fed into the weighing machines from the exits due to said torsional reciproactive oscillation.

6. A dispersing feeder according to claim 5, wherein the surface of said dispersing bowl is provided with a grid-like array of raised portions and a multiplicity of recessed portions surrounded by the raised portions.

7. A dispersing feeder according to claim 5 or 6, wherein said projection has a surface provided with a multiplicity of raised and recessed portions.

8. A dispersing feeder for dispersively feeding articles, supplied by a supplying apparatus, to a plurality of weighing machines where the articles are to be weighed, said feeder comprising:

a concially shaped projection for receiving said articles from the supplying apparatus, said projection comprising a dispersing table for receiving and temporarily retaining the articles supplied by the supplying apparatus, said dispersing table having a surface provided with a multiplicity of raised and recessed portions;

electromagentic vibrator means for subjecting said dispersing table to torsional reciprocative oscillation;

a dispersing path disposed concentrically with respect said projection and having a plurality of exits formed on the outer circumference thereof, said dispensing path comprising troughs around the dispersing table;

electromagnetic feeders for subjecting said troughs to oscillation;

an article transfer comprising said projection and said dispersing path, a part of the surface of which being rugged, said dispensing table being oscillated by said electromagnetic vibrator means to feed the articles to said troughs, and said troughs being oscillated to feed the articles into the weighing machines.

9. A dispersing according to claim 8, wherein the surface of said dispersing table is provided with a grid-like array of raised portions and a multiplicity of recessed portions surrounded by the raised portions.

* * * * *

UNITED STATES PATENT AND TRADEMARK OFFICE
CERTIFICATE OF CORRECTION

PATENT NO. : 4,570,831
DATED : February 18, 1986
INVENTOR(S) : ASAHIRO IZUMI ET AL.

It is certified that error appears in the above-identified patent and that said Letters Patent is hereby corrected as shown below:

Col. 6, line 13, "reciproactive" should be --reciprocative--;

line 25, "concially" should be --conically--;

line 32, "electromagentic" should be --electromagnetic--;

line 36, after "spect" intsert --to--;

line 49, after "dispersing" insert --feeder--.

Signed and Sealed this

Twenty-fourth Day of June 1986

[SEAL]

Attest:

DONALD J. QUIGG

Attesting Officer

Commissioner of Patents and Trademarks